(12) United States Patent
Sperry et al.

(10) Patent No.: US 6,862,868 B2
(45) Date of Patent: Mar. 8, 2005

(54) SYSTEM AND METHOD FOR PRODUCTION OF FOAM-IN-BAG CUSHIONS

(75) Inventors: Laurence B. Sperry, Boston, MA (US); Eric Kane, Lynn, MA (US); Jesse Drake, Belmont, MA (US); Anthony Davlin, Cambridge, MA (US)

(73) Assignee: Sealed Air Corporation (US), Saddle Brook, NJ (US)

(*) Notice: Subject to any disclaimer, the term of this patent is extended or adjusted under 35 U.S.C. 154(b) by 31 days.

(21) Appl. No.: 10/319,123

(22) Filed: Dec. 13, 2002

(65) Prior Publication Data

US 2004/0112011 A1 Jun. 17, 2004

(51) Int. Cl.$^7$ ................................................. B65B 1/22
(52) U.S. Cl. ........................................... 53/525; 53/127
(58) Field of Search .................... 53/440, 525, 472, 53/122, 127, 437, 550, 123

(56) References Cited

U.S. PATENT DOCUMENTS

| | | | |
|---|---|---|---|
| 4,347,993 A | 9/1982 | Leonard | ................... 242/75.51 |
| 4,729,520 A | 3/1988 | Kataoka | ..................... 242/56.2 |
| 4,775,086 A | 10/1988 | Kataoka | ........................ 226/44 |
| 4,826,065 A | 5/1989 | Natterer et al. | .............. 226/173 |
| 4,854,109 A * | 8/1989 | Pinarer et al. | .................. 53/397 |
| 5,105,603 A | 4/1992 | Natterer | ........................ 53/412 |
| 5,335,483 A * | 8/1994 | Gavronsky et al. | ............ 53/451 |
| 5,502,951 A | 4/1996 | Oliverio et al. | ................ 53/455 |
| 5,611,194 A | 3/1997 | Wildmoser | ..................... 53/562 |
| 5,699,902 A | 12/1997 | Sperry et al. | |
| 5,794,406 A * | 8/1998 | Reichental et al. | ............ 53/410 |
| 5,873,221 A * | 2/1999 | Sperry et al. | .................. 53/472 |
| 5,899,325 A | 5/1999 | Bertram et al. | |
| 5,986,239 A * | 11/1999 | Corrigan, III et al. | ....... 219/385 |
| 5,996,782 A | 12/1999 | Sperry et al. | |
| 6,065,636 A * | 5/2000 | Sperry et al. | ................... 221/92 |
| 6,131,375 A * | 10/2000 | Sperry | ........................... 53/472 |
| 6,272,813 B1 * | 8/2001 | Sperry et al. | .................. 53/440 |
| 6,289,649 B1 * | 9/2001 | Cherfane | .................... 53/284.7 |
| 6,386,850 B1 * | 5/2002 | Salerno et al. | ............... 425/112 |
| 6,393,930 B1 | 5/2002 | Song et al. | ............. 74/424.8 R |

* cited by examiner

Primary Examiner—Eugene Kim

(57) ABSTRACT

A system for heating and dispensing foam-in-bag packaging bags comprises a housing that rotatably supports a roll of a continuous web of interconnected foam-in-bag packaging bags, and at least one heater for heating bags to an elevated temperature prior to the bags being dispensed from the housing. A heated bag is dispensed and is detached from the web, and is then manipulated to mix foam precursor chemicals contained in separate compartments in the bag to begin a foam-forming reaction in the bag.

13 Claims, 9 Drawing Sheets

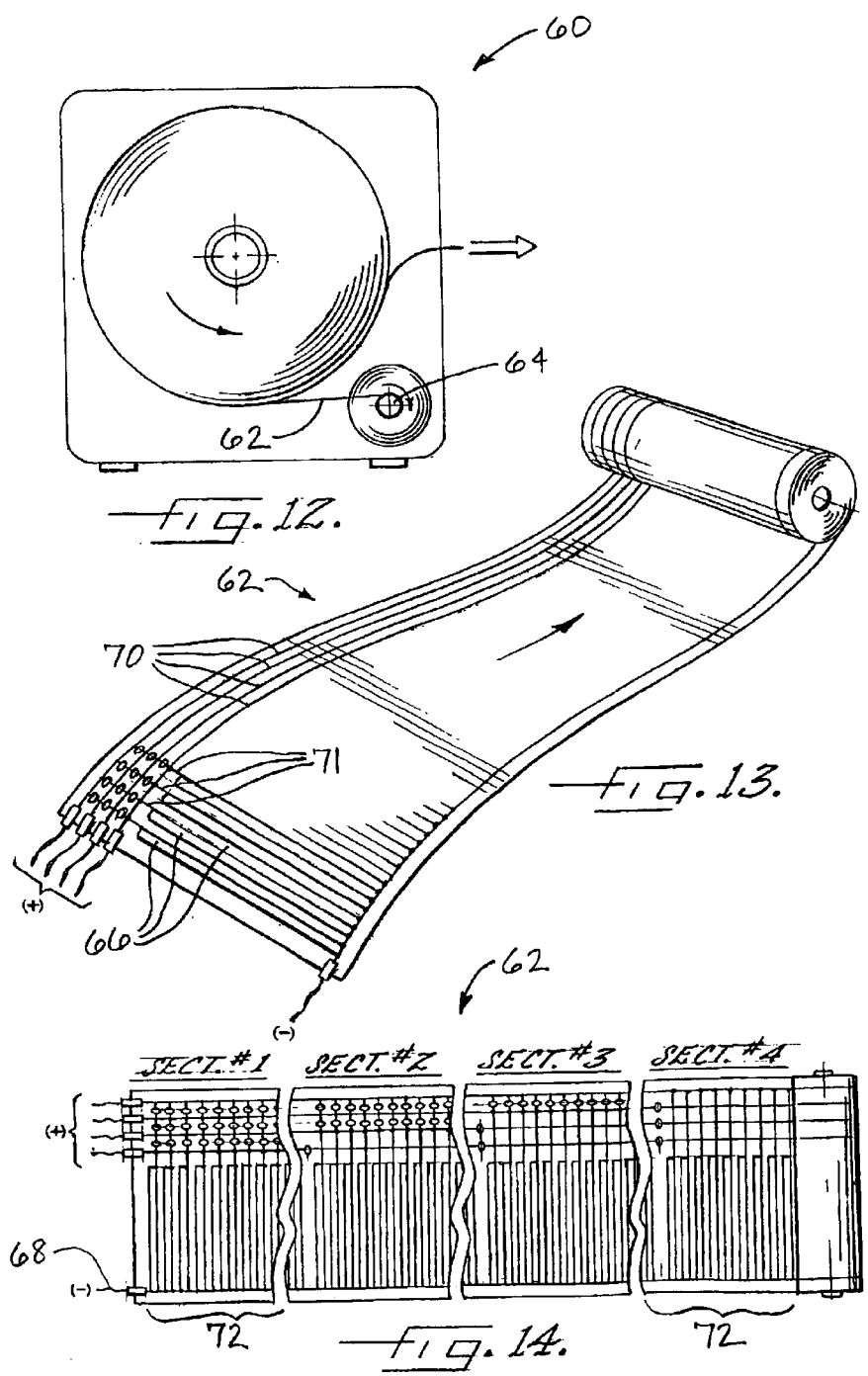

...

SYSTEM AND METHOD FOR PRODUCTION OF FOAM-IN-BAG CUSHIONS

FIELD OF THE INVENTION

The invention relates to the production of foam-in-bag packaging cushions, and relates more particularly to a system and method for producing such cushions on an as-needed basis, wherein packaging bags containing unmixed foam precursors are heated prior to mixing the precursors to hasten the foam-forming reaction.

BACKGROUND OF THE INVENTION

Foam-in-place packaging is a known technique for producing cushioning packaging for fragile articles to be shipped. Foam-in-place packaging comprises generating foam cushioning on an as-needed basis while the article to be protected is being packaged. In general, foam-in-place packaging employs foamable compositions that are produced by bringing together two or more precursor chemicals that react and form foam when mixed together. The chemicals are generally selected from among those chemicals that when mixed form polymeric foams that harden upon curing. For example, a liquid polyol-containing precursor and a liquid isocyanate-containing precursor may be mixed and reacted to form a polyurethane foam. The resulting foam occupies a volume that is many times the volume of the liquid precursors.

One technique for foam-in-place packaging is to place the article to be packaged in a container, and then to place one or more flexible plastic bags containing a foamable composition into the container. The foamable composition expands to cause the bag to fill the void space between the walls of the container and the article, and then hardens. The result is a foam cushion that conforms closely to the shape of the article and the container, and thereby cushions and protects the article. This technique is referred to herein as the foam-in-bag technique.

A number of automated devices have been developed for rapidly making a relatively large number of bags for foam-in-bag packaging, and are assigned to the assignee of the present application. Exemplary devices are described and claimed in U.S. Pat. Nos. 4,674,268; 4,800,708; 4,854,109; and 5,376,219. Because these devices mix the precursors together as they are placed in the bags, the resulting bags must be placed in the containers with the articles immediately. Accordingly, these devices are particularly suitable for use in situations where it is desirable and feasible to make the bags containing the foam precursors at the location where articles are being packaged.

However, in certain applications, it may not be desirable to employ such automated devices to make foam-in-bag packaging directly at the packaging location. Accordingly, an article for foam-in-bag packaging use has been developed in which the precursor chemicals are contained in a bag and kept separated from one another until it is desired to form a foam cushion. At that time, the bag may be manipulated to cause breakage of a frangible membrane that separates the two precursors and to mix the precursors together. The bag is then placed into the packaging container adjacent the article to be protected. The precursors react to form foam, and the bag expands to fill the void space and cures to form a cushion. Commonly owned U.S. Pat. Nos. 5,699,902; 5,899,326; 5,996,782; and 6,272,813 describe various bags of this type and systems for their production.

The speed of the foam-forming reaction and the final volume of the expanded foam generally depend on the temperature of the precursors; both the reaction speed and final volume tend to increase with increasing precursor temperature. Accordingly, heating devices for heating foam-in-bag packaging bags prior to use have been developed, as described in commonly owned U.S. Pat. Nos. 5,986,239 and 6,065,636. Heating the bags to a consistent temperature tends to result in the cushions having a predictable final volume, thereby improving the consistency and quality of the overall packaging operation. The heaters described in the '239 and '636 patents are designed to house a plurality of foam-in-bag packaging bags that are each folded into a compact arrangement and held in the folded condition by a band that encircles the folded bag. The folded bags are loaded into the heater and held there for a period of time until they are needed. Desirably each bag is held in the heater long enough to reach a desired elevated temperature, such as about 120° F., prior to being removed from the heater for use. In a busy packaging line where bags are continually being removed from the heater and replaced with unheated bags, it is possible to lose track of how long each bag has been in the heater, and hence a bag may be removed from the heater and used before the bag has reached the desired temperature. The heater described in the '636 patent includes a loading and dispensing arrangement for the bags that tends to ensure that the bags are used on a first-in, first-out basis, but it is possible to circumvent this arrangement. Additionally, the heater of the '636 patent relies on convective heating to warm the bags, which tends to be less efficient than the conductive heating employed in the '239 patent.

The heaters of the '239 and '636 patents also necessitate that the bags each be individually folded and banded. The production of such bags thus requires steps of separating bags from the continuous web of bags that comes off a manufacturing machine, folding each individual bag, and applying a band or the like to hold the bag in its folded configuration. To use a bag, the band must be removed and the bag must be unfolded.

SUMMARY OF THE INVENTION

The present invention was developed to improve upon the technology represented by the above-noted patents. The invention simplifies the manufacture and use of foam-in-bag packaging bags and thereby leads to lower costs. In accordance with the invention, bags are produced in the form of a roll of bags, which can be connected end-to-end, shingled, or in any other form. The bags can be unwound and separated from the roll as needed and then manipulated to break the frangible seal so as to mix the foam precursors. Thus, the steps of separating bags from one another, folding the bags, and applying a band or the like are eliminated from the manufacturing operation.

Heating a roll of bags is accomplished by any of various techniques employing various types of heating devices. In one embodiment of the invention, heating of the bags is accomplished by drawing a web of interconnected bags from a supply roll and winding the web onto a spool together with an elongate flexible heater that is placed in facewise disposition with one side of the web. The web and the heater are wound together about the spool so as to form a roll wherein the heater is interleaved with sequential turns of the web. The heater is operated to heat the bags to a desired temperature. The heater is in direct conductive heat-transfer relationship with each bag and all bags lying radially inwardly of the outermost turn of the web have minimal surfaces exposed to the surrounding air, such that heating is particularly efficient. The flexible heater can be an electrically heated device, or can be a passive thermal conduit that absorbs heat from another heating device and transfers the heat to the bags. A flexible electric heater in accordance with one aspect of the invention has a plurality of zones or segments arranged end-to-end along the length of the heater, the zones being independently operable so that some zones can be heating while others are turned off.

In another embodiment, a supply rolls of bags is arranged in a heater having a first heating element (which can be a plurality of heating elements) that surrounds at least a portion of the periphery of the roll to heat the roll. The first heating element can be spaced from the outer periphery of the roll, or can be in contact with the outer periphery and can be arranged so as to always engage the outer periphery of the roll even as the roll becomes smaller in diameter as bags are drawn from the roll. The first heating element in one embodiment can be a series of heater rollers on which the roll of bags is supported; in another embodiment, the first heating element can be a flexible heating blanket or the like that always closely hugs the outer periphery of the roll of bags. The heater can also include a second heating element that heats bags as they are drawn from the roll.

Alternatively, the supply roll of bags can be arranged in a heater that includes guide elements for guiding the web from the roll along a path past one or more heating elements forming a heating zone. The heater can include drive rolls for driving the web along the path. The rolls can be arranged to take the web along a circuitous path to increase the residence time of the moving web in the heating zone.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 12 shows a heating and dispensing apparatus in accordance with a further embodiment of the invention;

FIG. 13 shows a perspective view of a segmented flexible heater in accordance with one embodiment of the invention;

FIG. 14 is an elevation of the segmented heater;

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
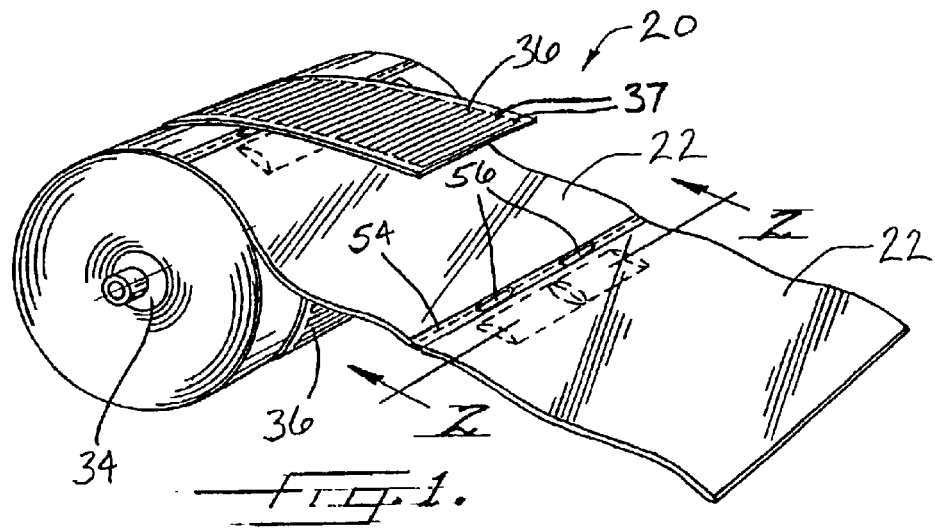
FIG. 1 is a perspective view of a roll of foam-in-bag packaging bags having a flexible heater wound with the bags.
Figure 2:
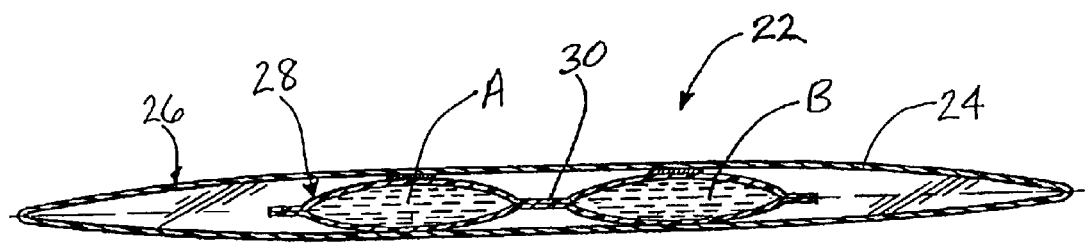
FIG. 2 is a cross-sectional view through one of the bags.
Figure 3:
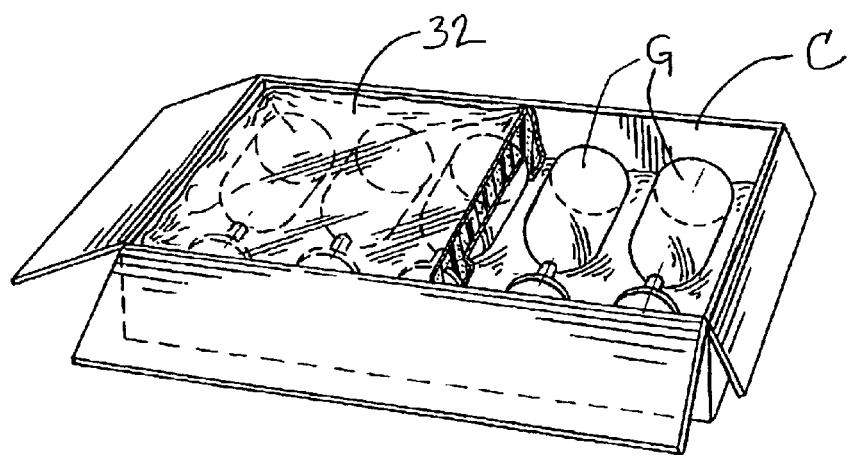
FIG. 3 illustrates a typical usage of a foam-in-bag packaging bag to package fragile articles in a carton.

The invention is based on supplying foam-in-bag packaging bags in the novel form of a roll of interconnected bags. The bags are then wound onto a spool along with an elongate flexible heater that is disposed against one side of the web of bags. FIG. 1 illustrates the resulting roll of bags 20, and FIG. 2 shows details of one of the bags 22. As shown, in general a foam-in-bag packaging bag 22 comprises a plastic film 24 that is manipulated to place two film portions in overlying relation and sealed along edges of the film portions to form a "mother" bag 26. Contained within mother bag 26 is a precursor packet 28. The precursor packet 28 defines two separate compartments containing two liquid foam precursors A and B. The packet 28 is formed of a film material that is impervious to and is not degraded by the precursors. The packet 28 includes at least one frangible seal 30 that separates the two compartments. The frangible seal can be broken by manipulation of the packet 28 through the mother bag 26, so that the two precursors A and B mix together and react to form a foam that expands to substantially fill the space defined in the mother bag 26 and then cures and hardens, thus forming a foam packaging cushion 32 as shown in FIG. 3. In a typical usage, while the foam is starting to expand, the bag 22 is placed into a carton C along with articles to be shipped such as the illustrated glasses G. The foam continues to expand and thus fills the spaces between the carton and the articles, forming a custom-fit packaging cushion 32.

As noted, a web of interconnected bags 22 is wound onto a spool 34 along with an elongate flexible heater 36 to form the roll 20. The web of bags 22 can be produced on conventional web-handling machinery such as that illustrated in U.S. Pat. No. 5,899,325, incorporated herein by reference, except that the web is not severed along lines between bags; instead, the web of interconnected bags coming off the machine is wound onto a spool to form a supply roll. The web is then drawn from the supply roll and wound onto the spool 34 along with the heater 36.

The flexible heater 36 is in the form of a long generally flat strip. The heater can comprise electrical resistance heating elements 37 embedded or contained within a generally flat substrate of suitable material.

The heater 36 has a sufficient length to extend along the entire length of the web of bags 22. Accordingly, when the web of bags is wound onto the spool 34 along with the heater 36, the resulting roll has the heater 36 interleaved between all adjacent turns of the web. Thus, a given bag within the interior of the roll is actually sandwiched between two successive turns of the heater 36 such that conductive heat transfer occurs into each bag from opposite surfaces thereof. Additionally, the bags in the interior of the roll are exposed to surrounding air substantially only along the side edges of the bags, which are quite small in relation to the entire surface area of the bags. The result of this arrangement is that heating of the bags by the heater 36 occurs in a particularly efficient manner.

Figure 4:
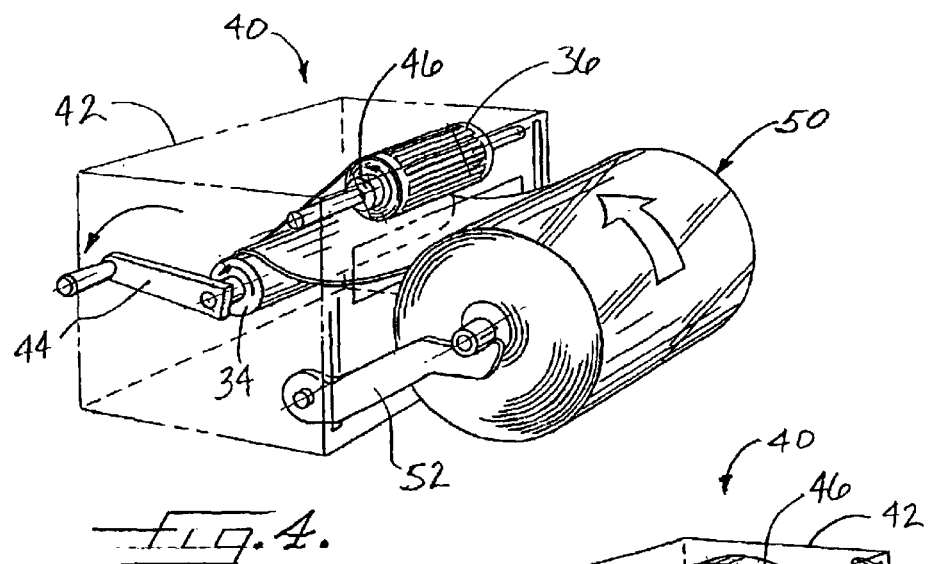
FIG. 4 is a schematic representation of an apparatus for heating and dispensing bags in accordance with one embodiment of the invention, showing unheated bags being loaded into the apparatus.
Figure 5:
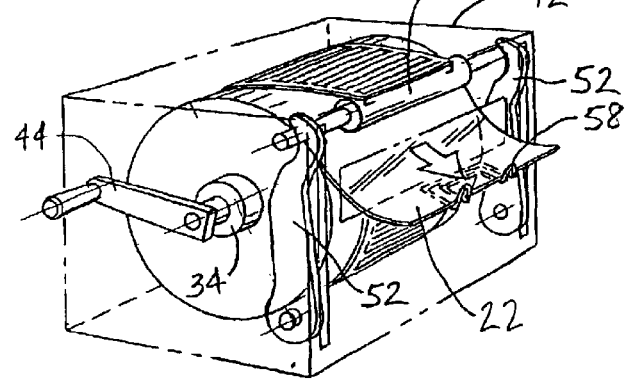
FIG. 5 shows the apparatus in a loaded condition ready to dispense bags.
Figure 6:
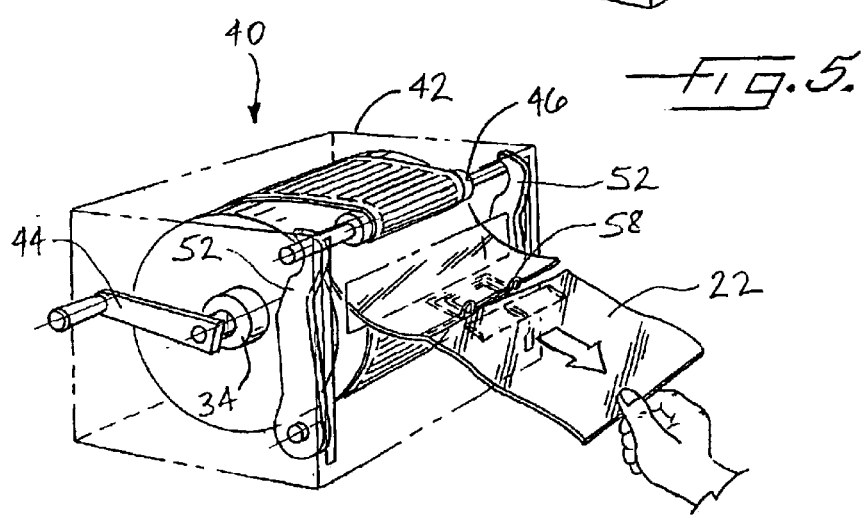
FIG. 6 shows a bag being torn from the web of bags on the roll.

FIGS. 4 through 6 illustrate an apparatus 40 for heating and dispensing bags 22 in accordance with one embodiment of the invention. The apparatus includes a frame 42 in which the bag spool 34 is rotatably supported, and also includes means for rotating the bag spool 34 about its axis to wind a web of bags and the heater onto the spool. In the illustrated embodiment, the means for rotating the bag spool 34 comprises a simple manual crank 44; alternatively, the means for rotating the bag spool can comprise an electric motor or other powered actuator device (not shown). The apparatus further includes a heater spool 46 rotatably supported in the frame 42. The heater 36 is wound about the heater spool 46. It is advantageous to have one end of the heater affixed to the heater spool 46 and an opposite end of the heater affixed to the bag spool 34. The heater can be wound onto the bag spool 34 by rotating the bag spool about its axis in one direction (counterclockwise in the drawings).

The apparatus 40 also includes a mounting arrangement for rotatably supporting a supply roll 50 of interconnected bags 22. The mounting arrangement in the illustrated embodiment comprises a pair of arms 52 pivotally mounted to the frame 42. The arms 52 are pivotable between active and inactive positions. In the active position, the arms 52 extend generally horizontally outward from a front side of the apparatus 40 and the free ends of the arms define crooks in which opposite ends of the supply roll spool rest so that the roll can freely rotate about the spool axis. In the inactive position, the arms 52 are pivoted up so that they do not project out from the front side of the apparatus and thus do not hinder access to the front side of the apparatus during a bag dispensing operation as further described below. The arms 52 are merely one example of a mounting arrangement for the supply roll 50, and other alternative mounting arrangements can be used.

Bags are loaded into the apparatus 40 by mounting a supply roll 50 of bags in the arms 52 in their active position as shown in FIG. 4. The apparatus advantageously includes a tether (not shown) attached to the bag spool 34. The tether in a starting position is extended out the dispensing opening of the apparatus from which bags are dispensed. An end of the tether includes a feature for attachment to the endmost bag of the supply roll 50; the bag spool 34 is then rotated to wind the tether onto the bag spool, which in turn draws the web of bags into the apparatus and begins winding the bags onto the spool. The rotation of the bag spool 34 also causes the heater 36 to be wound onto the bag spool with the web of bags. Winding is continued until the heater 36 has been fully unwound and then the supply roll 50 is removed (first detaching remaining web material on the roll 50, if any, from the web wound about the bag spool 34) and the arms 52 are moved into their inactive position, as depicted in FIG. 5. Next, the heater 36 is activated to heat the roll of bags wound on the bag spool 34. The apparatus 40 can include one or more temperature sensors (not shown) for sensing the temperature of the roll of bags at one or more locations, and a temperature control system (not shown) can be employed to automatically control the operation of the heater to regulate the bag temperature to a substantially constant predetermined value. The temperature control system can include an indicator light or the like (not shown) for indicating when the bags have reached the desired temperature.

Once the bags have reached the desired temperature, they are ready to be dispensed. This is accomplished simply by grasping the endmost bag 22 on the roll and pulling it outwardly from the apparatus, and then severing the web along a line that divides the endmost bag from the next bag. The web of bags can include easy-tear features between bags to facilitate tearing a bag from the web. The easy-tear features can include a line of weakness 54 (FIG. 1) formed by perforations, laser scoring, or the like, extending across the width of the web at the junctures between adjacent bags. The easy-tear features can also include one or more apertures 56 formed through the web at the junctures between bags for cooperating with a bag tear-off member 58 (FIGS. 5 and 6). The bag tear-off member 58 is mounted on the front side of the apparatus and is positioned so that the web of bags can be drawn over the member 58 as a bag is pulled out from the apparatus. The member 58 is aligned with the apertures 56 in the web so that when a juncture between two bags reaches the member, the member penetrates through the apertures (aided by the weight of the bags which urges the bags downwardly) and then tends to prevent further advancement of the web, thus allowing the endmost bag to be torn from the web with the aid of the line of weakness 54, as illustrated in FIG. 6. The detached bag is then manipulated to break the frangible seal separating the two precursor compartments so that the foam-forming reaction begins, and the bag is placed into a carton or container along with one or more articles.

As bags are pulled from the roll on the bag spool 34, the heater 36 must be rewound onto the heater spool 46. The apparatus 40 can include means for rewinding the heater on the heater spool. The means for rewinding the heater can comprise a gear or belt arrangement (not shown) connected between the bag spool 34 and the heater spool 46 such that rotation of the bag spool 34 also causes rotation of the heater spool 46. The arrangement preferably has a gear ratio selected such that the heater spool 46 is "overdriven" relative to the bag spool 34 and a clutch bearing (not shown) or the like provided on the bag spool allows the bag spool to slip as necessary so that the flexible heater 36 is maintained in tension as it is rewound.

Figure 7:
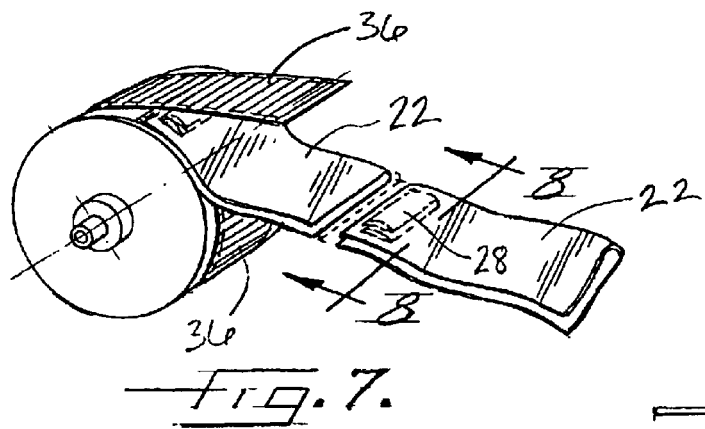
FIG. 7 illustrates an alternative configuration of a roll of bags wherein the bags are folded in half.
Figure 8:
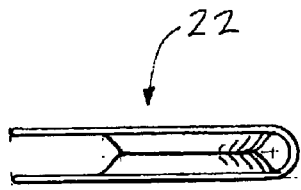
FIG. 8 is a cross-sectional view through one of the folded bags in FIG. 7.

The web of bags in the embodiment described above is wound into a roll in an unfolded condition. It is possible, however, to fold the web along one or more longitudinally extending fold lines prior to winding the web into a roll. For instance, FIG. 7 depicts a roll of bags in which the web is folded in half about a longitudinal line. The precursor packet 28 can be located so that the two precursor compartments are on opposite sides of the fold line, and thus one compartment overlies the other compartment after the web is folded, as shown in FIG. 8.

Figure 9:
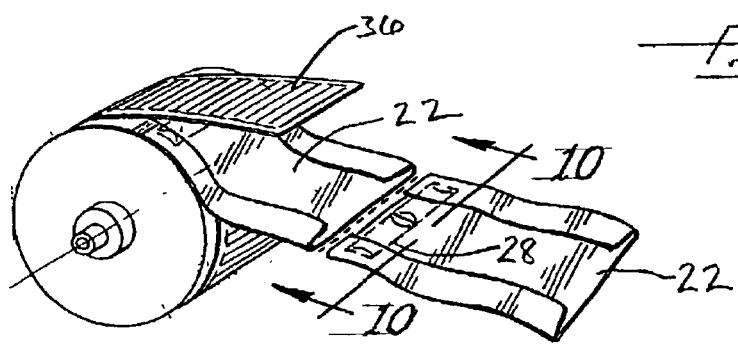
FIG. 9 shows yet another alternative configuration of a roll of bags wherein opposite side edge portions of the bags are folded inwardly upon a central region of the bags.
Figure 10:
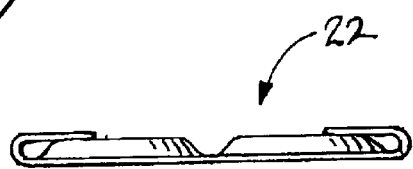
FIG. 10 is a cross-sectional view through one of the folded bags in FIG. 9.

Another alternative roll configuration is shown in FIGS. 9 and 10. The web includes opposite edge portions that extend outward beyond the precursor packet 28. The opposite edge portions are folded inwardly onto the central portion of the web.

Figure 11:
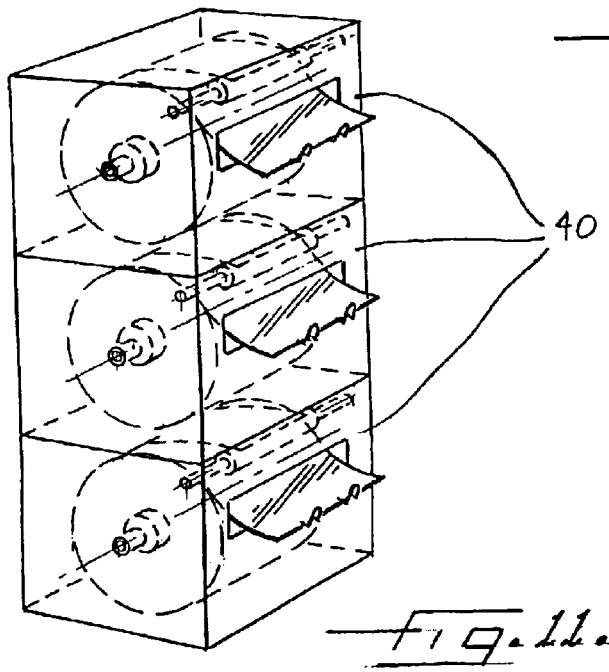
FIG. 11 illustrates three heating and dispensing apparatuses stacked one upon another.

The apparatus 40 for heating and dispensing bags can be designed so that it can be stacked upon another such apparatus 40. FIG. 11 shows three apparatuses 40 stacked together. The several apparatuses may each dispense bags of a different size from those dispensed by the other apparatuses.

FIGS. 12 through 14 illustrate a further embodiment of the invention employing a flexible heater similar to that described above, except the heater is segmented or zoned. A heating and dispensing apparatus 60 in accordance with this embodiment includes an elongate flexible segmented heater 62 that is unwound from and rewound onto a spool 64, similar to the apparatus 40. The heater 62 is wound with a web of bags into a roll and is operated to heat the roll of bags. FIGS. 13 and 14 show the segmented heater 62 in greater detail. The heater 62 has a plurality of electrical heating elements 66 each connected at one end to one terminal lead 68 and at the opposite end to the other terminal lead 70 of an electrical power supply (not shown). The heating elements 66 can be formed by printing electrically resistive ink onto a non-conductive substrate of the heater. The heating elements 66 are arranged in zones or segments 72 that are joined end-to-end along the lengthwise direction of the heater. The heating elements 66 of each segment are connected to the electrical power supply independently of the other segments, such that the power supply to each segment can be controlled independently of the power supply to the other segments. In accordance with the invention, when the heater 62 is wound with the web of bags into the roll, all of the segments 72 of the heater that are in contact with bags are electrically powered to heat the bags. As the bags are dispensed and the heater is rewound onto the spool 64, the segments are progressively turned off so that only the segments still in contact with bags are powered.

The zoning of the heater 62 can be accomplished by providing one positive conductor lead 70 for each segment running along the full length of the heater parallel and spaced from each other as shown. Transverse conductor leads 71 extend across and connect to the lengthwise leads 70 and to the heating elements 66. To ensure that each segment of the heater is connected to only one of the lengthwise leads 70, the connections between the transverse leads 71 and all but the one of the lengthwise leads 70 are broken or interrupted (such as by punching holes at the intersections of the leads as shown), and the lengthwise lead 70 that connects to a particular segment is broken or interrupted at a point beyond the segment as shown. Of course, other ways of segmenting the heating can be used instead.

Figure 15:
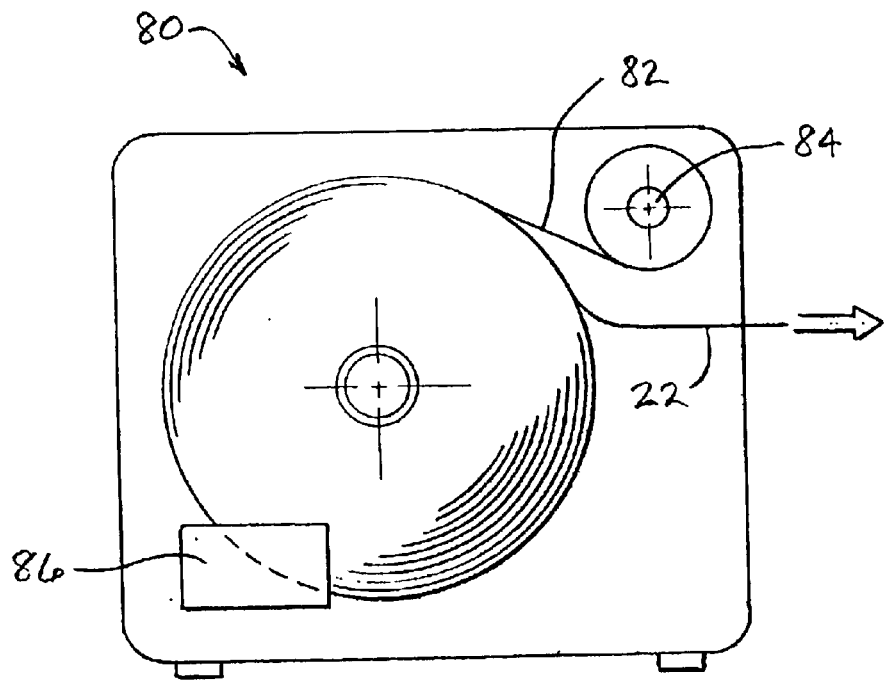
FIG. 15 depicts a heating and dispensing apparatus in accordance with another embodiment of the invention, employing a flexible thermal conduit that is wound with the bags into a roll and heated by heating elements disposed adjacent the roll.
Figure 16:
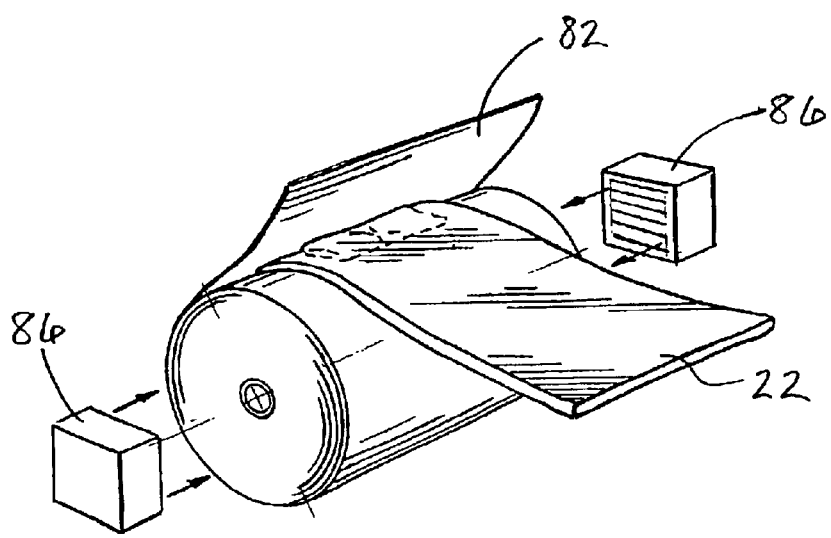
FIG. 16 is a perspective view showing the roll and heating elements of the apparatus in FIG. 15.

FIGS. 15 and 16 illustrate another embodiment of the invention. The apparatus 80 of this embodiment is somewhat similar to the apparatus 60, except that instead of employing an electrically operated flexible heater, the apparatus 80 employs a passive flexible thermal conduit 82 that is unwound from and rewound onto a spool 84. The thermal conduit 82 is wound with a web of bags 22 into a roll and is operated to heat the roll of bags. The thermal conduit 82 is heated by one or more heating elements 86 disposed proximate the roll of bags wound with the conduit. The heating elements 86 heat the conduit 82, which absorbs heat and in turn heats the bags. The thermal conduit can be made of any suitable material that readily absorbs and conducts heat, such as thin metal (e.g., aluminum, copper, etc.). Aluminum flashing material of about 0.020 inch thickness has been found to be suitable. Advantageously, as shown, the conduit 82 is wider than the bags 22 so that the conduit protrudes out from both ends of the roll and thus is readily heated by the heating elements 86.

Figure 17:
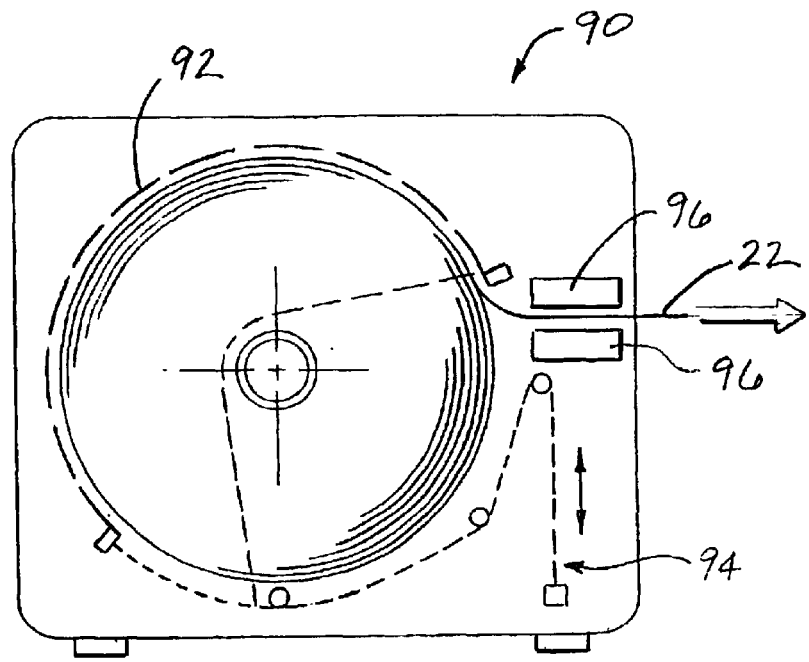
FIG. 17 shows a heating and dispensing apparatus in accordance with yet another embodiment of the invention.

FIG. 17 shows yet another embodiment of the invention. The apparatus 90 of this embodiment includes a heating element 92 that closely surrounds, and preferably contacts, the outer circumference of a roll of bags 22. The heating element 92 preferably is movable so as to adapt to the changing diameter of the roll as bags are dispensed; accordingly, the heating element 92 is connected to an arrangement 94 for biasing the flexible heating element 92 so as to urge the heating element into continuous contact with the outer periphery of the roll of bags. The apparatus also includes a second heater in the form of two spaced heating elements 96 between which the bags 22 pass prior to being dispensed, to further elevate the temperature of the bags to the desired temperature.

Figure 18:
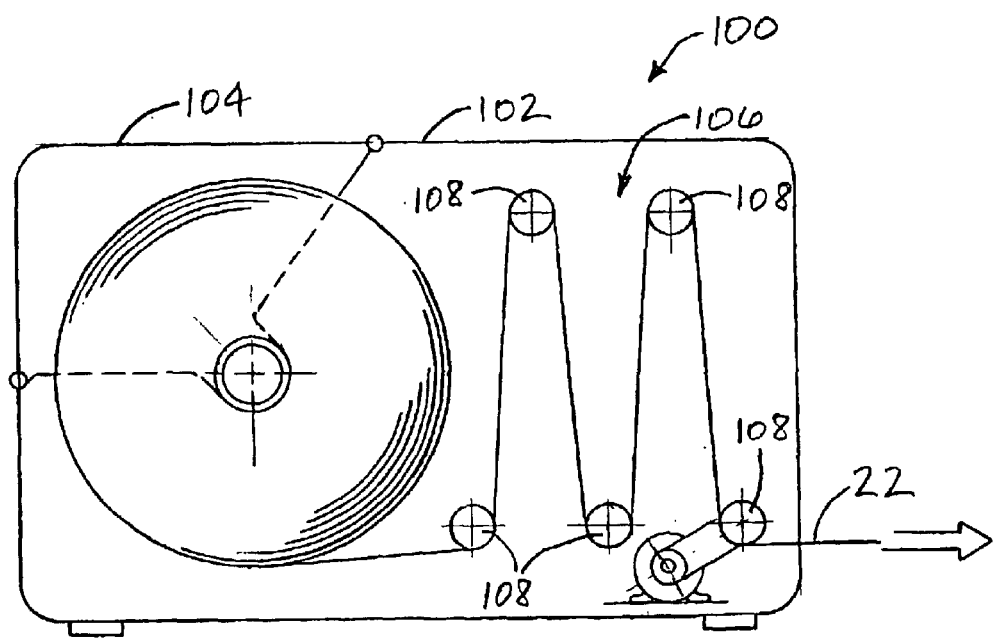
FIG. 18 illustrates an apparatus in accordance with an additional embodiment of the invention.

FIG. 18 depicts an apparatus 100 in accordance with a further embodiment of the invention. The apparatus 100 is configured to rotatably mount a roll of bags 22 in the housing 102 of the apparatus; the housing includes a movable cover or door 104 that is opened to place the roll into the interior of the housing and then closed so that the housing completely encloses the roll. The housing defines a heated space 106 that is heated by one or more heating elements (not shown). The apparatus includes a plurality of web guides 108 that guide the web of bags 22 along a long circuitous path through the heated space 106. Thus, the bags are heated as they pass through the heated space and are then dispensed from the housing.

Figure 19:
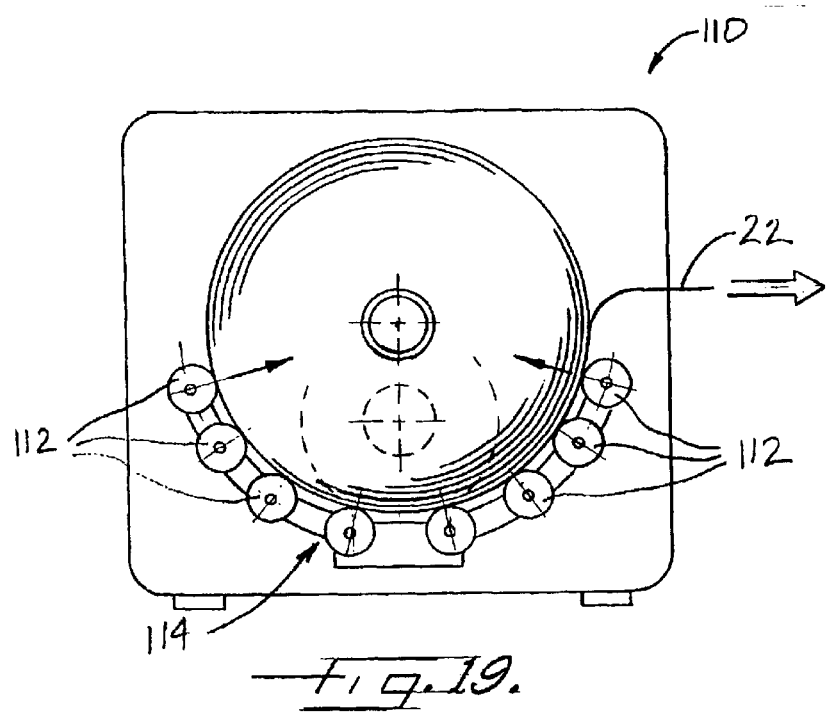
FIG. 19 shows a further embodiment of the invention.

FIG. 19 shows an apparatus 110 in accordance with another embodiment of the invention. The apparatus 110 includes a plurality of heated rollers 112 that are spaced about the circumference of a roll of bags 22 and are in contact with the outer periphery of the roll to heat the roll. The rollers 112 are arranged to be movable in a generally radial direction of the roll and are urged by a biasing arrangement 114 radially inwardly against the roll so that the rollers maintain contact with the outer periphery of the roll as the roll shrinks in diameter as bags are dispensed. The mounting arrangement (not shown) for the roll of bags allows the roll's center axis to drop down as the roll decreases in diameter, as shown in dashed lines.

Figure 20:
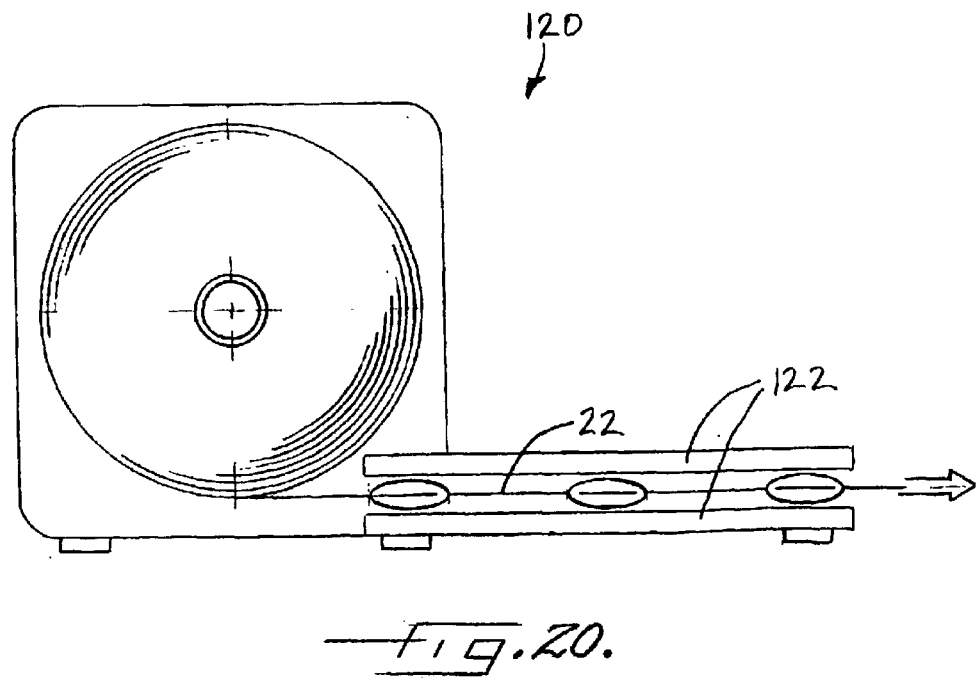
FIG. 20 depicts yet another embodiment of the invention.

FIG. 20 illustrates an apparatus 120 in accordance with yet another embodiment of the invention. In this embodiment, the bags 22 are directed from the roll between a pair of heated plates 122 that are parallel and closely spaced, such that the bags are heated as they pass through the space between the plates and are then dispensed.

Figure 21:
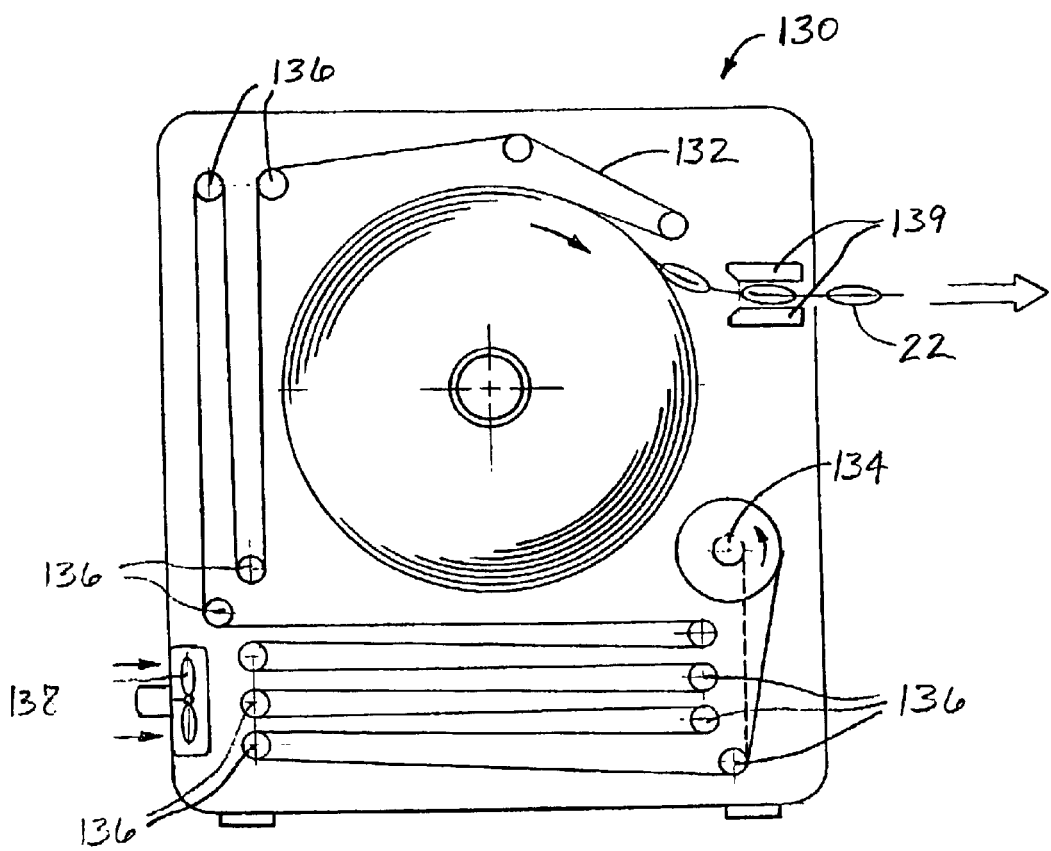
FIG. 21 represents an apparatus in accordance with another embodiment of the invention.

FIG. 21 shows a further embodiment of the invention. The apparatus 130 in accordance with this embodiment employs an elongate flexible heater 132 that it wound with the bags into a roll, similar to some of the previously described embodiments. The heater 132 is unwound from and rewound onto a spool 134. Unlike the previously discussed embodiments, however, the apparatus 130 has a plurality of heater guides 136 for guiding the heater 132 along a long circuitous path in the housing of the apparatus. The heater 132 advantageously can be segmented in the manner described in connection with FIGS. 13 and 14, and the segments passing along the circuitous path can be turned off. A fan 138 is arranged for blowing cooling air across the heater 132 as it traverses its circuitous path, so as to dissipate heat from the heater when it is being rewound onto the spool 134. The apparatus 130 also includes a second heater in the form of a pair of heated plates 139 located adjacent the dispensing outlet of the apparatus. The heated plates 139 are spaced apart and the bags 22 pass between the plates and are thereby heated before being dispensed.

Figure 22:
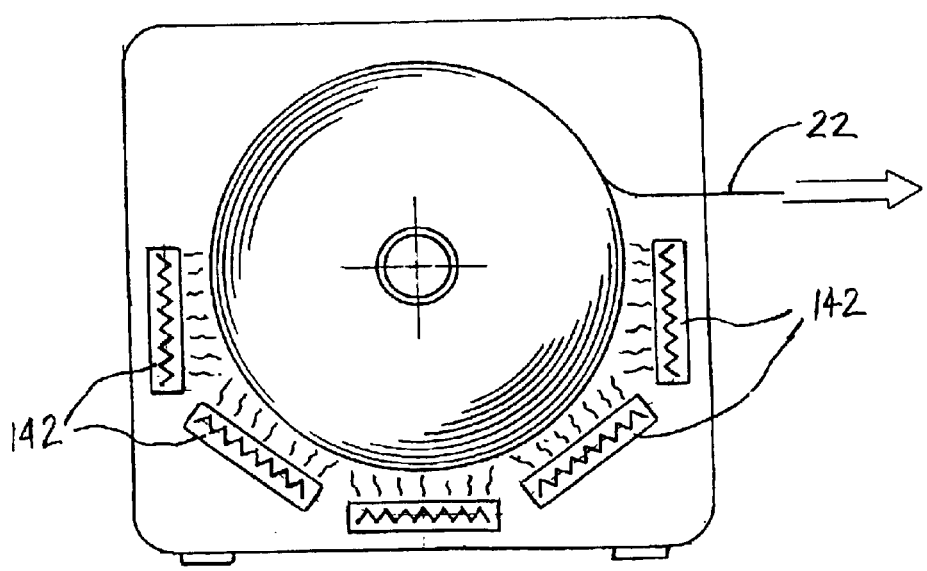
FIG. 22 shows yet another apparatus in accordance with the invention.

An apparatus 140 in accordance with another embodiment of the invention is shown in FIG. 22. In this embodiment, the roll of bags 22 is heated by a plurality of radiant heating elements 142 disposed proximate the outer periphery of the roll. The heating elements 142 heat the roll by radiant heat.

Figure 23:
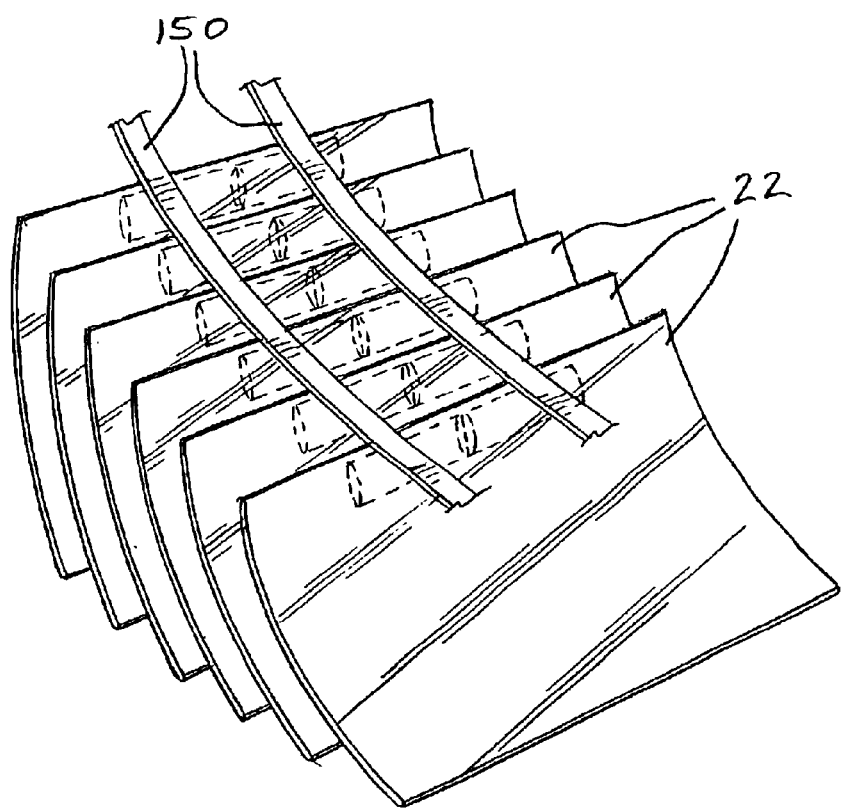
FIG. 23 depicts a plurality of bags connected together in a shingled configuration.

In the foregoing description of various embodiments of the invention, it has been assumed that the web of bags 22 is in the form of bags that are connected end-to-end. However, it is possible to form the web in other ways. FIG. 23 shows an example of a web of bags 22 that are arranged in a shingled arrangement and connected together by a pair of adhesive tapes 150 or the like. Such a web can be wound into a roll for use in any of the previously described embodiments of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for on-demand production of foam-in-bag cushions, comprising:
   a continuous web of interconnected bags, each bag formed of flexible plastic film material and defining therein an enclosed space of a volume corresponding to the size of the foam cushion to be produced and defining a first compartment containing a first foam precursor and a second compartment containing a second foam precursor, wherein each bag includes a frangible seal that is rupturable by manipulating the bag so as to cause the foam precursors to mix and react to form a foam that expands within the enclosed space of the bag and thereafter cures to form a foam cushion; and
   an apparatus structured and arranged to rotatably support a roll of said web of interconnected bags, the apparatus further comprising:
      web guides for guiding the web from the roll along a path to a discharge through which the web is dispensed from the apparatus; and
      at least one heating element for heating the web of interconnected bags such that bags prior to being dispensed from the discharge are heated to an elevated temperature to hasten a foam-forming reaction upon use of the bags, wherein the at least one heating element comprises a flexible heater formed as an elongate generally flat strip, and wherein the web of bags is disposed in face-to-face relation with the heater and wound to form said roll of the bags with the heater interleaved with the bags, the heater being operable to heat the bags to an elevated temperature to hasten the foam-forming reaction.

2. The system of claim 1, further comprising a rotatable bag spool onto which the web of bags and the heater are wound to form the roll.

3. The system of claim 2, further comprising a rotatable heater spool onto which the heater is wound prior to winding the web of bags with the heater onto the rotatable bag spool, wherein the heater is unwound from the rotatable heater spool as the web of bags and the heater are wound onto the rotatable bag spool.

4. The system of claim 3, wherein the rotatable heater spool is operable to rewind the heater thereon as bags are withdrawn from the roll.

5. The system of claim 3, wherein the heater has a plurality of active heater segments connected end-to-end along a length of the heater, the heater segments each being operable to be turned on and off independently of the other heater segments.

6. The system of claim 5, further comprising heater guides structured and arranged for guiding the heater along a circuitous path between the heater spool and the bag spool.

7. The system of claim 6, further comprising a fan arranged to blow air across the heater as the heater passes along the circuitous path so as to cool the heater.

8. The system of claim 3, wherein one end of the heater is affixed to the rotatable heater spool.

9. The system of claim 8, wherein an opposite end of the heater is affixed to the rotatable bag spool.

10. The system of claim 2, further comprising a mounting arrangement for rotatably supporting a supply roll of unheated bags to be wound onto the rotatable bag spool, whereby the unheated bags are unwound from the supply roll as the unheated bags are wound with the heater onto the rotatable bag spool.

11. The system of claim 2, wherein the rotatable bag spool is mounted in a frame having a front side from which bags are unwound from the roll on the rotatable bag spool, and further comprising a member positioned on the front side of the frame and operable to engage the web to facilitate detaching a bag therefrom.

12. The system of claim 11, wherein the web includes easy-tear features separating the bags from one another and the member is arranged to pierce the web at one of the easy-tear features as the web is drawn over the member.

13. The system of claim 1, wherein the elongate flexible heater comprises a passive thermal conduit, and further comprising one or more heating elements for heating the thermal conduit.

* * * * *